(12) United States Patent
Yamaguchi

(10) Patent No.: US 6,525,441 B2
(45) Date of Patent: Feb. 25, 2003

(54) SPINDLE MOTOR HAVING DISC MOUNTING PORTION

(75) Inventor: Tadao Yamaguchi, Isesaki (JP)

(73) Assignee: Tokyo Parts Industrial Co., Ltd., Gunma-Ken (JP)

( * ) Notice: Subject to any disclaimer, the term of this patent is extended or adjusted under 35 U.S.C. 154(b) by 0 days.

(21) Appl. No.: 09/814,823

(22) Filed: Mar. 23, 2001

(65) Prior Publication Data

US 2001/0024069 A1 Sep. 27, 2001

(30) Foreign Application Priority Data

Mar. 23, 2000 (JP) .......................... 2000-82352

(51) Int. Cl.⁷ .............. H02K 5/16; H02K 5/24; H02K 11/00; H02K 5/00; G11B 17/02
(52) U.S. Cl. .............. 310/90; 310/51; 310/67 R; 310/91; 360/99.05; 360/99.12
(58) Field of Search .......... 360/99.05, 99.12, 360/98.08, 99.04, 98.07, 256.2; 310/51, 67 R, 261, 91, 90, 89; 369/75.2, 271

(56) References Cited

U.S. PATENT DOCUMENTS

| | | | | |
|---|---|---|---|---|
| 4,599,664 A | * | 7/1986 | Schuh | 360/99.08 |
| 4,922,406 A | * | 5/1990 | Schuh | 360/99.08 |
| 5,715,116 A | * | 2/1998 | Moritan et al. | 360/99.08 |
| 5,724,209 A | * | 3/1998 | Dunckley et al. | 360/98.08 |
| 5,729,403 A | * | 3/1998 | Schuh | 360/99.08 |
| 5,737,149 A | * | 4/1998 | Shin | 360/99.08 |
| 5,783,880 A | * | 7/1998 | Teshima et al. | 310/67 R |
| 5,862,120 A | * | 1/1999 | Mukawa | 360/99.12 |
| 6,198,715 B1 | * | 3/2001 | Kouno et al. | 369/263 |
| 6,242,826 B1 | * | 6/2001 | Saito et al. | 310/51 |
| 6,249,505 B1 | * | 6/2001 | Miyamoto et al. | 360/99.08 |
| 6,252,319 B1 | * | 6/2001 | Sudo et al. | 310/51 |
| 6,339,273 B1 | * | 1/2002 | Higuchi | 310/67 R |
| 6,356,408 B1 | * | 3/2002 | Nii et al. | 310/67 R |

* cited by examiner

Primary Examiner—Nestor Ramirez
Assistant Examiner—Guillermo Perez
(74) Attorney, Agent, or Firm—Leydig, Voit & Mayer, Ltd.

(57) ABSTRACT

A spindle motor includes a rotor case in which a shaft support is located at the center of the rotor and disc mounting guides are located around the shaft support at a predetermined interval, a shaft installed at the shaft support, a disc chuck spring having at least one disc inner hole chucking portion and arranged at the rotor case such that at least one disc inner hole chucking portion slightly protrudes between the disc mounting guides, a magnet inside the rotor case, an armature stator facing the magnet via a gap, and a stator base where the armature stator is located, the stator base supporting the shaft inside the armature stator.

8 Claims, 4 Drawing Sheets

SPINDLE MOTOR HAVING DISC MOUNTING PORTION

BACKGROUND OF THE INVENTION

1. Field of the Invention

The present invention relates to an improved spindle motor for driving optical media such as MDs, CDs or DVDs, and more particularly, to a spindle motor having a disc mounting portion in which a disc can be mounted on a rotor itself without an additional turntable.

2. Description of the Related Art

In general, a turntable on which an optical medium is mounted is installed on an output shaft protruding from a main body of a spindle motor for driving the optical media. The motor and the turntable are installed separately. A spindle motor including an automatic balancer installed under the turntable for automatically correcting imbalance has been suggested to prevent vibrations due to imbalance in a rotation system of a motor for high speed rotation including a medium.

Referring to in FIG. 4, which shows one of the various types of automatic balancers, a turntable T and a thin cylindrical case E installed at the bottom surface of the turntable T are installed at an output shaft of a motor portion M. A plurality of small balls B are accommodated within the cylindrical case E. Imbalance in a centrifugal force generated during rotation is corrected by using the free movement of these balls B.

However, since the conventional automatic balancer needs such a turntable or an imbalance correcting member, when a motor is to be designed to have a low profile, the features of a motor are sacrificed. Accordingly, to maintain the features of a motor, use of an expensive magnet is necessary.

Furthermore, since a stator base SB typically arranged at the lower portion of the motor is used as a support of the shaft, the height of the shaft up to the turntable greatly affects vibrations of the shaft. Thus, each member is required to have a very fine tolerance, which increases the manufacturing cost of the turntable or imbalance correcting member, and thus increases the cost of the motor.

SUMMARY OF THE INVENTION

To solve the above problems, it is an object of the present invention to provide a spindle motor having a disc mounting portion which reduces the number of parts by improving a rotor case to have a simple structure and function as a turntable It is another object of the present invention to provide a spindle motor which has a low profile even though it has a disc mounting portion which has an automatic unbalance correcting function.

Accordingly, to achieve the above object, there is provided a spindle motor comprising a rotor case in which a shaft support portion is installed at the center of the rotor and a plurality of disc mounting guides are formed by being lifted from the upper surface around the shaft support portion at a predetermined interval, a shaft installed at the shaft support portion, a disc chuck spring having at least one disc inner hold chucking portion and arranged at the rotor case such that the chucking portion slightly protrudes radially between the disc mounting guides, a magnet arranged inside the rotor case, an armature stator facing the magnet via a gap, and a stator base where the armature stator is arranged, the stator base supporting the shaft inside the armature stator.

It is preferred in the present invention that a disc slippage prevention sheet is provided at the outer circumferential portion of the rotor case.

It is preferred in the present invention that a bulge portion is formed along the outer circumferential portion of the rotor case so that the outer circumferential portion of the rotor case bulges and a plurality of balls are arranged in the bulge portion to be used for unbalance correction.

It is preferred in the present invention that holes formed when the disc mounting guides are integrally lifted are covered by the disc chuck spring.

It is preferred in the present invention that the disc chuck spring is pressed by a magnetic body for attraction.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
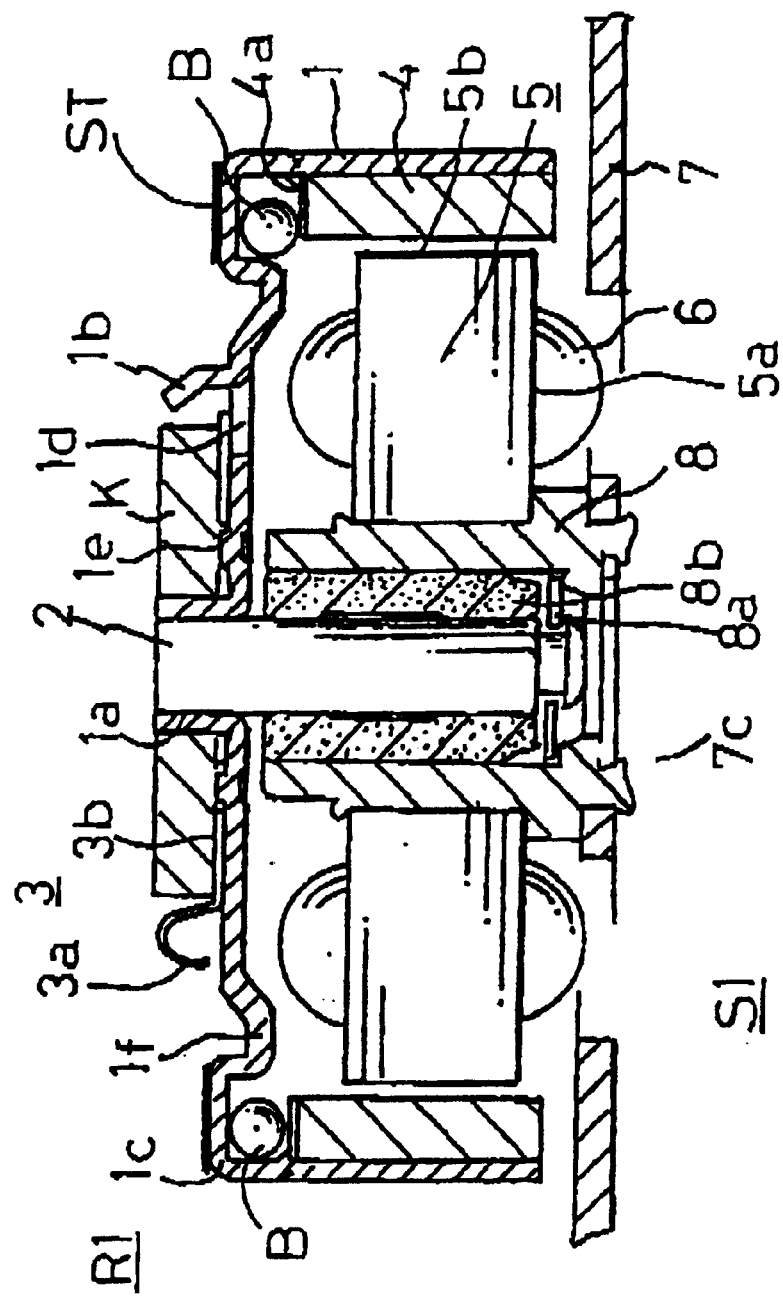
FIG. 1 is a sectional view of a spindle motor having a disc mounting portion according to a preferred embodiment of the present invention, taken along line II-II of FIG. 2.
Figure 2:
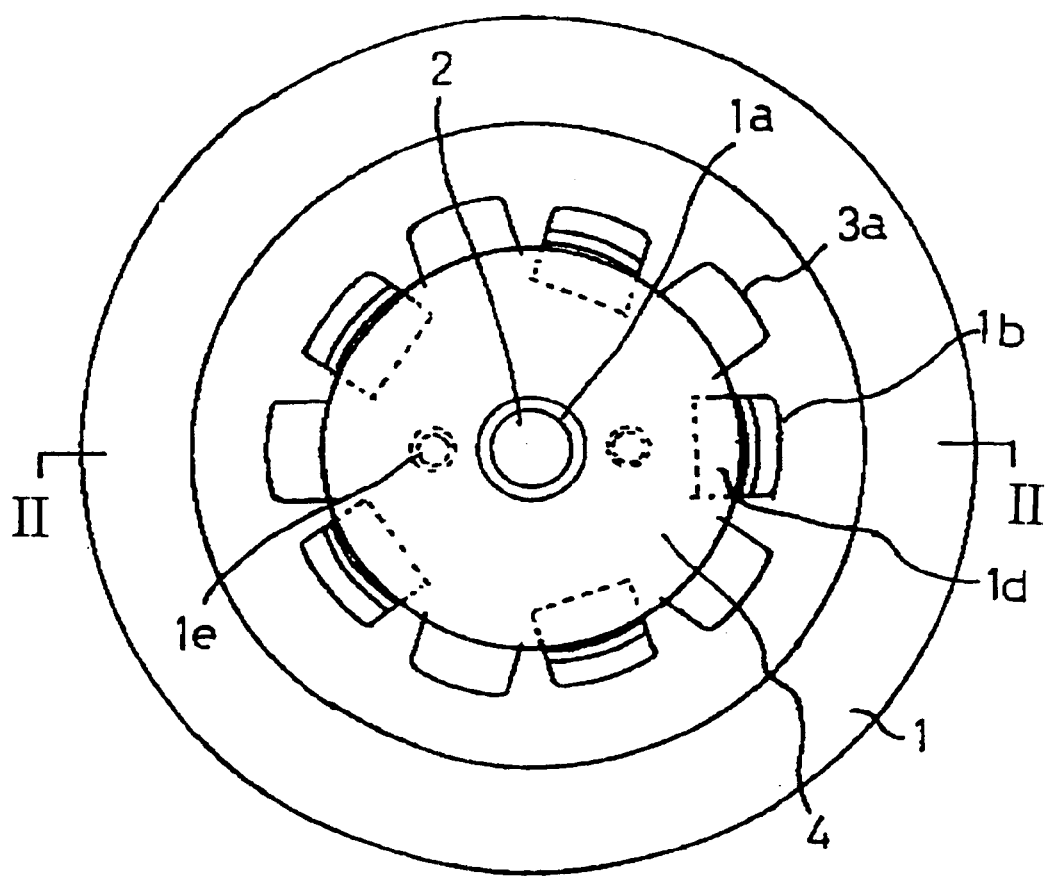
FIG. 2 is a plan view of the rotor shown in FIG. 1.

Referring to FIGS. 1 and 2, reference numeral 1 denotes a rotor case having a disc mounting function. A shaft support portion 1a for supporting a shaft 2 with pressure protrudes. Simultaneously, a plurality of disc mounting guides 1b (five in the present embodiment) at predetermined intervals are integrally formed by being lifted from the upper surface around the shaft support portion 1a. These disc mounting guides 1b are concentric with the shaft 2, which is concentric with the center of a disc to be mounted and to have a radius of curvature slightly less than the center hole of the disc so that a disc (not shown) is not damaged. A bulge portion 1c is formed at the rotor case 1 so that the outer circumferential portion of the rotor case 1 can bulge.

Reference numeral 3 denotes a disc chuck spring having at least one disc inner hole chucking portion 3a to firmly mount the disc. When there are a plurality of disc inner hole chucking portions, at least one disc inner hole chucking portion 3a (five in the present embodiment) is arranged between the disc mounting guides 1b at the rotor case 1 such that the disc inner hole chucking portion 3a slightly protrudes. A flat portion 3b of the disc chuck spring 3 is covers a hole 1d that is necessarily formed from the lifting of the disc mounting guide 1b. The position of the flat portion 3b is determined by a position determining guide 1e. The flat portion 3b aligns the disc inner hole chucking portion 3a with respect to the shaft 2 and is spot-welded to a position on the rotor case 1 other than that of the hole 1d.

Thus, the position determining guide 1e and the disc chuck spring 3 are preferably made so that the position determining guide 1e can be inserted into the disc chuck spring 3 rather loosely. As a result, centering of a disc can be automatically performed by the disc chuck spring 3 having a predetermined elasticity.

The upper surface of the bulge portion 1c is cut to make a right angle with the shaft 2 after the shaft 2 is installed by being pressed. A slippage prevention sheet ST is attached on the upper surface of the bulge portion 1c so that the disc is prevented from slippage during rotating at high speed.

A magnet 4 formed of rubber or plastic and having a cylindrical shape forming a radial gap type is accommodated inside the rotor case 1. Also, a thin magnetism shielding plate 4a is installed on the upper surface of the magnet 4 so that the balls B, which are an imbalance correcting means accommodated in a space formed inside the bulge portion 1c, can freely move.

In FIG. 1, reference numeral 1f denotes a ball stopping portion formed by being deformed along the circumference of the rotor case 1, and reference numeral K denotes a magnet which is used as a magnetic body for attraction. Also, when the balls B are non magnetic, the thin magnetism shielding plate 4a is not necessary.

A rotor R1 having the above structure is combined with a radial gap type armature stator S1, thus forming a brushless motor. The stator S1 includes a core 5 formed by laminating a plurality of silicon steel plates and an armature coil 6 wound around a salient pole portion 5a of the core 5. A blade portion 5b of the stator S1 faces the cylindrical magnet 4 via a gap. The stator S1 is fixed to a bearing housing 8 which is incorporated into a stator base 7 formed of a metal circuit board. The stator S1 can be fixed by using a screw or an adhesive.

The rotor R1 is rotatably installed at the stator S1 via the shaft 2 which is supported by an oilless bearing 8b inserted in the bearing housing 8, so that a radial gap type brushless spindle motor is completed. Here, by intentionally setting the center of a magnetic field of the magnet 4 and the center of stacked layers of the core 5 to be acentric with each other in a direction along the shaft 2, the rotor R1 is always attracted toward the stator S1 to prevent the rotor R1 from separating.

Also, to prevent the rotor R1 separating in an axial direction, various techniques have been suggested. Here, a stopper ring 8a is forcibly inserted in the groove formed in the shaft 2. To reduce the cost, the shaft housing may be a resin bearing housing for directly supporting the shaft 2.

Figure 3:
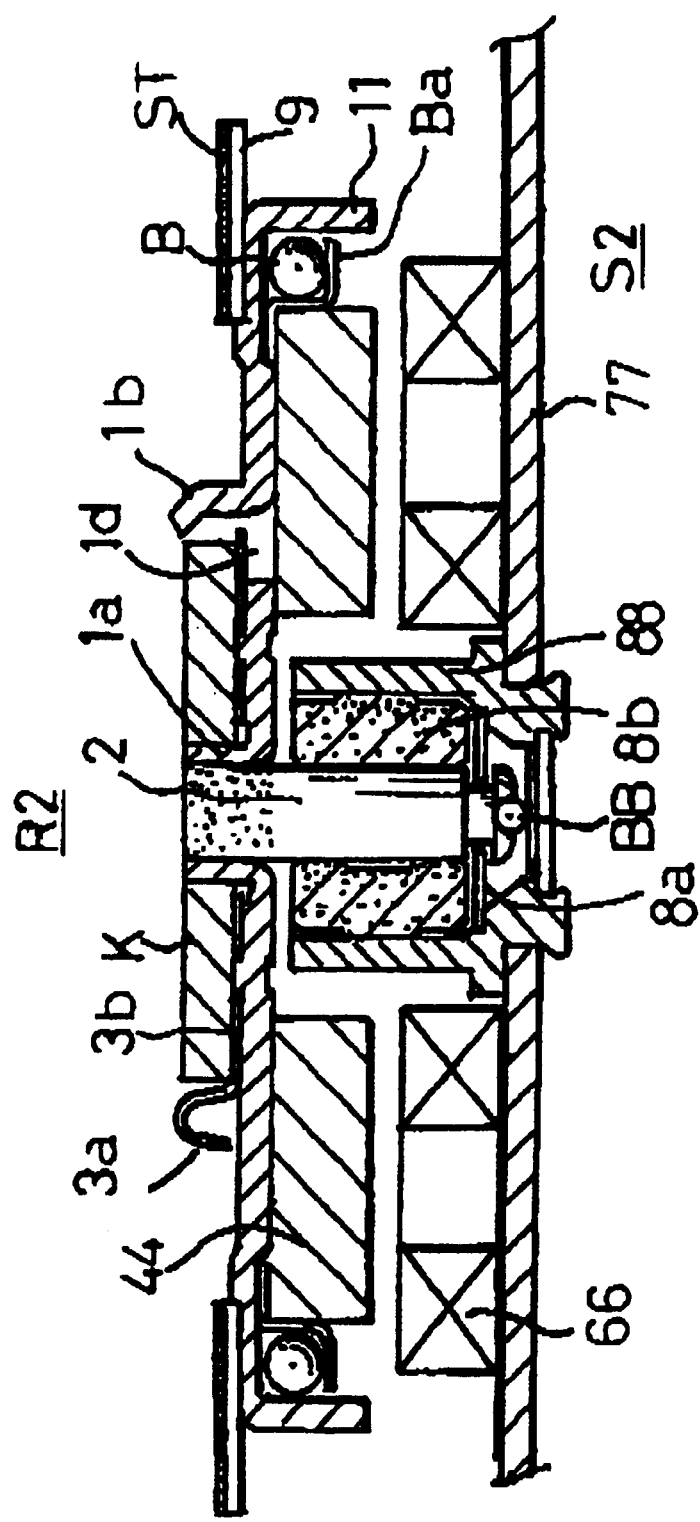
FIG. 3 is a sectional view of an axial gap type spindle motor according to another preferred embodiment of the present invention.
Figure 4:
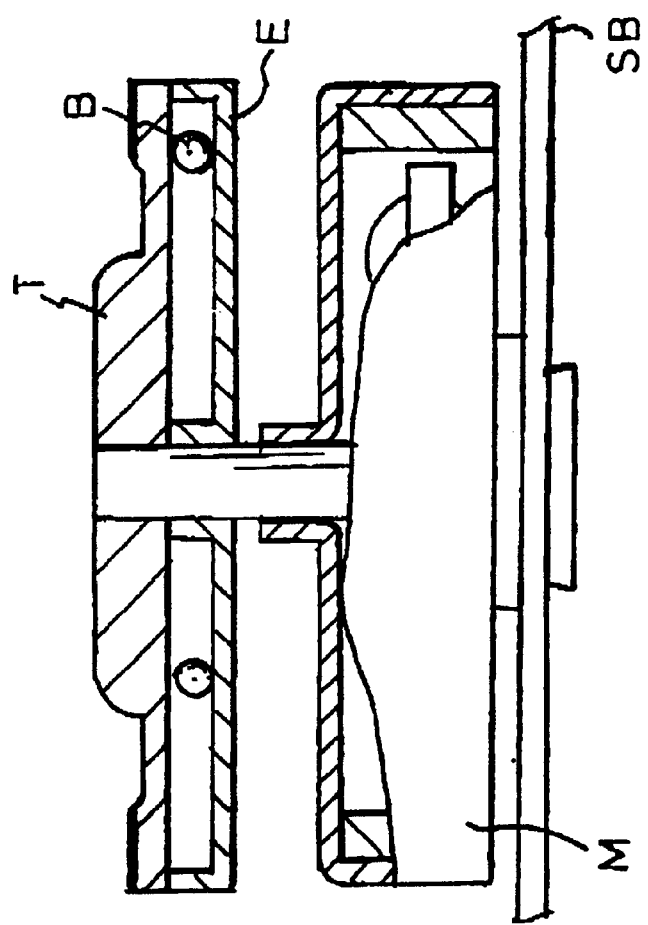
FIG. 4 is a sectional view of a conventional spindle motor having a disc mounting portion.

FIG. 3 shows an axial gap type brushless spindle motor according to another preferred embodiment of the present invention. Here, the upper surface of a rotor case 11 is the same as that of the first preferred embodiment of FIG. 1. However, since the motor of this embodiment is of an axial gap type, a cylindrical ring type disc magnet 44 having a plurality of N poles and S poles alternately magnetized is fixed at the ceiling of the rotor case 11. A ball holder Ba formed of a thin magnetic plate to shield magnetism to a certain degree is provided at the outer circumference of the magnet 44 to accommodate balls B which are steel bodies. When the rotor R2 rotates at a predetermined rotation speed, the balls B move inside the ball holder Ba so that imbalance of the rotor case 11 where a disc (not shown) is mounted can be corrected. Also, the intensity of a leakage magnetic field affecting the ball holder Ba is preferably such that the balls B are attracted toward the magnet 44 and do not move when the rotor case 11 does not rotate.

The stator S2 for driving the rotor R2 includes a plurality of air core armature coils 66 arranged on a stator base 77 formed of a magnetic body to face the magnet 44 via an axial gap. Here, since the rotor R2 is of an axial gap slot-less type, it is strongly attracted by the stator base 77, which causes a problem of brake loss in the axial direction. Thus, the bottom end portion of the shaft 2 is has a recess having a reversed V-shape profile and a ball is inserted in the recess. As a result, the brake loss is reduced.

Since the main body of the motor according to this embodiment is too small with respect to a disc, a thin, ring type disc 9 is spot-welded to the outer circumferential portion of the rotor case 11 and processed to be perpendicular to the shaft 2. Since the thin, ring type disc 9 can be formed by a pressing process, the cost can be reduced. Of course, the thin, ring type disc 9 may be applied to the above-described radial gap type motor.

Also, the ball B used for imbalance correction can be formed of a non or weak magnetic body such as stainless steel so as not to be affected by the magnetic field of the magnets 4 and 44 in each of the above and this embodiments. In FIG. 3, the same members as those in FIGS. 1 and 2 have the same reference numerals and detailed descriptions thereof are omitted.

It is noted that the present invention is not limited to the preferred embodiments described above, and it is apparent that variations and modifications by those skilled in the art can be effected within the spirit and scope of the present invention defined in the appended claims.

As described above, in the spindle motor having a disc mounting portion of according to the present invention, since the rotor case itself functions as a turntable, an additional turntable is not needed so that the cost can be reduced and the height of the motor can be reduced. Accordingly, if the thickness of the motor of the present invention increases relative to that of the conventional turntable, a cheaper magnet can be used in the present motor to provide the same characteristics.

Also, since a metal rotor case can function as a turntable, the motor can be used for driving media rotating at a high speed. Since an used space can be utilized, an imbalance correcting means having a low height can be formed. Intrusion of foreign materials into the rotor can be prevented. The disc chuck spring itself provides a function as a return path plate for forming a magnetic path of the attracting magnet.

What is claimed is:

1. A spindle motor comprising:
    a rotor including a rotor case having
        a first wall,
        a shaft support transverse to the first wall and located at a center of the rotor case,
        at least three disc mounting guides extending outward from the first wall of the rotor case at respective holes in the first wall, spaced from each other, and arranged so that, a center defined by the disc mounting guides is coincident with the center of the rotor case,
        a bulge portion protruding outwardly at an outer circumferential portion of the first wall of the rotor case, and
        a sidewall depending from and transverse to the first wall;
    a disc slippage prevention sheet attached to the first wall at the bulge portion;
    a shaft having respective first and second ends, the first end of the shaft being installed in the shaft support;
    a disc chuck spring having at least one disc inner hole chucking portion for pressing radially outwardly against an inner hole of a disc mounted on the spindle motor, the disc chuck spring being disposed on the first wall of the motor case and protruding radially between a pair of the disc mounting guides;

a magnet body mounted on the first wall of the rotor case extending towards, but not reaching, the disc mounting guides, and pressing the disc chuck spring against the first wall;

a magnet mounted inside the rotor case;

a stator base including a shaft housing containing a bearing supporting the shaft;

an armature stator opposite and spaced from the magnet by a gap and disposed outside the shaft housing; and extraction preventions means in the shaft housing at the second end of the shaft for preventing extraction of the shaft from the shaft support.

2. The spindle motor as claimed in claim 1, wherein the armature stator is mounted on the shaft housing.

3. The spindle motor as claimed in claim 1, wherein the magnet is mounted on the sidewall of the rotor case and the gap is transverse to the shaft.

4. The spindle motor as claimed in claim 1, including a plurality of balls disposed within the rotor case between the magnet and the bulge portion for imbalance correction of the spindle motor.

5. The spindle motor as claimed in claim 1, wherein the disc chuck spring covers the holes in the first wall of the rotor case at the disc mounting guides.

6. The spindle motor as claimed in claim 1, wherein the extraction prevention means comprises a reduced diameters section of the shaft near but not extending to the second end and a stopper ring having an inside diameter smaller than that of the shaft and larger than that of the reduced portion, surrounding the reduced porting and disposed within the shaft housing.

7. The spindle motor as claimed in claim 1, wherein the magnet is mounted on the first wall of the rotor case and the gap is parallel to the shaft.

8. The spindle motor as claimed in claim 7, comprising a thrust bearing including a ball disposed of the second end of the shaft.

* * * * *